(12) United States Patent
Mezzino et al.

(10) Patent No.: US 11,162,592 B2
(45) Date of Patent: Nov. 2, 2021

(54) PRESSURE REGULATING SHUT-OFF VALVE

(71) Applicant: Microtecnica S.r.l., Turin (IT)

(72) Inventors: Giacomo Mezzino, Turin (IT); Gianfranco Salvatoriello, Turin (IT)

(73) Assignee: MICROTECNICA S.R.L., Turin (IT)

( * ) Notice: Subject to any disclaimer, the term of this patent is extended or adjusted under 35 U.S.C. 154(b) by 83 days.

(21) Appl. No.: 16/407,269

(22) Filed: May 9, 2019

(65) Prior Publication Data
US 2019/0390779 A1    Dec. 26, 2019

(30) Foreign Application Priority Data

Jun. 22, 2018 (EP) .................................... 18179260

(51) Int. Cl.
| F16K 3/26 | (2006.01) |
| G05D 16/10 | (2006.01) |
| B22F 5/10 | (2006.01) |
| G05D 16/20 | (2006.01) |

(52) U.S. Cl.
CPC ........... *F16K 3/265* (2013.01); *G05D 16/106* (2013.01); *B22F 5/106* (2013.01); *G05D 16/2097* (2019.01)

(58) Field of Classification Search
CPC .. F16K 3/265; G05D 16/106; G05D 16/2097; B22F 5/106
See application file for complete search history.

(56) References Cited

U.S. PATENT DOCUMENTS

| 5,540,252 A | 7/1996 | Bruum | |
| 5,551,483 A * | 9/1996 | Hochstrasser | .......... E03C 1/104 137/846 |
| 6,119,713 A * | 9/2000 | Pino | ......................... E03D 3/06 137/218 |
| 6,554,018 B1 * | 4/2003 | Pino | .................... F16K 31/3855 137/218 |
| 6,920,895 B2 * | 7/2005 | Avis | ....................... F16K 17/30 137/462 |
| 7,140,386 B2 * | 11/2006 | Avis | ....................... F16K 17/30 137/504 |
| 9,334,967 B2 * | 5/2016 | Larsen | .................. F16K 31/041 |
| 9,376,308 B2 * | 6/2016 | Petrangeli | ............ F16K 15/145 |
| 9,415,645 B2 * | 8/2016 | Racine | ................. B60C 23/003 |
| 9,599,237 B2 * | 3/2017 | Larsen | .................... F16K 1/427 |

(Continued)

FOREIGN PATENT DOCUMENTS

EP    3203126 A1    8/2017

OTHER PUBLICATIONS

Extended European Search Report for International Application No. 18179260.7 dated Jan. 4, 2019, 7 pages.

*Primary Examiner* — Craig M Schneider
*Assistant Examiner* — Christopher D Ballman
(74) *Attorney, Agent, or Firm* — Cantor Colburn LLP

(57) ABSTRACT

A regulating piston for a pressure regulating shut-off valve comprises: a tubular sleeve; a first closed end; a second open end; a port defined in the tubular sleeve between the first and second ends, arranged to permit fluid flow between the exterior and interior of the regulating piston; and a support structure disposed within the piston arranged to direct fluid flow between the port and the second open end. The piston can be included in a pressure regulating shut-off valve, and methods for manufacturing the piston and valve.

14 Claims, 9 Drawing Sheets

(56) References Cited

U.S. PATENT DOCUMENTS

| | | | |
|---|---|---|---|
| 9,720,420 B2* | 8/2017 | Uchida | F16K 31/0693 |
| 9,851,020 B2 | 12/2017 | Fahrner et al. | |
| 9,879,599 B2 | 1/2018 | Mercier et al. | |
| 9,915,353 B2* | 3/2018 | Westwater | F16K 1/42 |
| 10,302,224 B2* | 5/2019 | Kluz | F16K 47/08 |
| 10,344,873 B2* | 7/2019 | Herold | F16K 3/246 |
| 10,551,856 B2* | 2/2020 | Olberding | F16K 27/0254 |
| 10,625,221 B2* | 4/2020 | Schneider | B01F 15/00935 |
| 10,641,397 B2* | 5/2020 | Bjerrehorn | F16K 1/44 |
| 10,642,288 B2* | 5/2020 | Middlebrook | F16K 31/165 |
| 10,823,306 B2* | 11/2020 | Carpignano | F16K 27/041 |
| 2004/0182438 A1 | 9/2004 | Kobes | |
| 2007/0056897 A1* | 3/2007 | Bhardwaj | B01D 35/147 |
| | | | 210/437 |
| 2010/0200076 A1* | 8/2010 | Hieb | A61M 5/16827 |
| | | | 137/15.04 |
| 2017/0030265 A1 | 2/2017 | O'Toole et al. | |
| 2017/0220055 A1* | 8/2017 | Quaglia | B22F 3/1055 |
| 2017/0336812 A1 | 11/2017 | Dante et al. | |

* cited by examiner

PRESSURE REGULATING SHUT-OFF VALVE

This application claims priority to European Patent Application No. 18179260.7 filed Jun. 22, 2018, the entire contents of which is incorporated herein by reference.

The present invention concerns a regulating piston for a pressure regulating shut-off valve, a pressure regulating shut-off valve comprising such a regulating piston, and methods of manufacturing such a regulating piston and pressure regulating shut-off valve.

Pressure regulating shut-off valves (PRSOVs) are designed to operate in the inlet anti-ice system of an aircraft engine. Their operation is generally known, for example, from US 2017/0336812 A1. Typically, PRSOVs comprise a regulating piston, the position of which controls downstream pressure by controlling the flow of fluid from the valve inlet to the valve outlet. In an open position, e.g. when downstream pressure is as desired, the regulating piston allows fluid to flow from the valve inlet to the valve outlet, typically via a fluid port in the piston. When the downstream pressure increases beyond a predetermined threshold, a pressure differential is formed within the PRSOV which causes the regulating piston to move to a closed position in which fluid flow from the valve inlet to the valve outlet is prevented. The regulating piston may also take any position between its open and closed positions if needed, and so may smoothly vary and control the flow of fluid from the valve inlet to the valve outlet. The regulating piston is therefore disposed within the fluid flow path within the valve and has an important effect on fluid flow and fluid dynamics within the valve.

Moreover, PRSOVs must operate in extreme temperature and pressure conditions, and must be reliable enough to ensure flight safety. The materials that PRSOVs are made from must therefore be able to accommodate high temperatures and pressures, while being sufficiently durable to ensure safety. It is also desirable that PRSOVs should be as light as possible, since they are employed in aircraft.

SUMMARY

According to a first aspect of the present invention there is provided a regulating piston for a pressure regulating shut-off valve (PRSOV), wherein the regulating piston comprises: a tubular sleeve; a first closed end; a second open end; a port defined in the tubular sleeve between the first and second ends, arranged to permit fluid flow between the exterior and interior of the regulating piston; and a support structure disposed within the piston arranged to direct fluid flow between the port and the second open end.

Since the regulating piston plays a fundamental role in fluid dynamics within a PRSOV, the piston of the present disclosure provides a means of reducing turbulence within the fluid flow by directing fluid flow between the port and the second open end of the piston, which in use may be aligned with an outlet of a valve. Conventional valves merely include a port in a sleeve of a piston and hence flow into the piston is often turbulent and unguided. Turbulent flow reduces pressure and hence efficiency of the system, and the present disclosure therefore provides a means of reducing these negative effects.

The support structure may be arranged to intercept fluid entering the regulating piston via the port and/or the second open end. The support structure may curve smoothly (e.g. without any gradient discontinuities) from the port towards the second open end of the piston, thereby providing a surface for smoothly guiding fluid flow into the piston from the port and reducing turbulence in that flow. The surface of the support structure that directs fluid flow may curve through approximately a right angle, so that fluid directed thereby is smoothly redirected by about 90°. The part of the surface of the support structure closest to the port may be oriented substantially perpendicular to the port (e.g. in a radial direction of the piston), and the surface of the support structure furthest from the port may be substantially parallel with a longitudinal axis of the piston. The support may take any shape suitable for directing fluid flow and reducing turbulence therein. At least a portion of the support structure may be defined by a surface of revolution and may be circularly symmetrical e.g. about the longitudinal axis of the piston. The surface of the support structure may be sufficiently smooth that fluid flow thereover is not tripped to turbulent flow. As such, the support structure within the piston may help avoid generation of turbulence therein and reduce pressure loss within the valve, thereby improving efficiency. The support structure may provide a desired mass-flow guidance.

The regulating piston may be formed by an additive manufacturing technique. Such a technique may comprise formation of the piston by sequential layering of incremental amounts of material. The whole piston may therefore be homogenous and its parts integrally formed with each other. Moreover, it may comprise geometries that are too complicated to create by other means. For example, the support structure may be formed entirely within the regulating piston and may have a smooth curved shape that would be difficult or impossible to create by machining or other conventional processes which have to date been used for manufacturing regulating pistons for PRSOVs.

The port may extend about the entire periphery of the piston. The piston may be substantially cylindrical and the port may therefore extend about the whole circumference of the piston such that a ring of the cylinder is absent in order to provide the port. The port may consist of a single contiguous hole in the tubular sleeve of the piston. Fluid flow through the port may be undisturbed and hence smoother than that achieved by known pistons. Alternatively, the port may comprise a plurality of holes in the sleeve of the piston. Since the port may be integrally formed with the piston, it is not necessary to cut or punch the port out of an existing cylinder or tube, and therefore the periphery of the port may be made smooth and the risk of burrs or other imperfections that might trigger turbulence may be reduced.

The support structure may bridge the port. The support structure may connect to portions of the piston (e.g. to portions of the tubular sleeve) either side of the port. The support structure may thereby be positioned in the flow path of fluid entering the piston via the port and may direct flow of that fluid. The support structure may be the only connection between portions of the tubular sleeve separated by the port, thereby enabling the port to be a contiguous hole in the sleeve about its entire circumference.

The support structure may comprise a plurality of vanes. Each vane may be configured to guide fluid flow between the port and the second open end and to avoid triggering of turbulence within that flow. Each vane may be joined to and integrally formed with the tubular sleeve of the piston, and hence may improve the structural integrity of the piston. The support structure may comprise a plurality of vanes separated by equal angles within the piston. The support structure may comprise three vanes.

The support structure may be solid throughout and contiguous with the first closed end of the regulating piston.

Alternatively, the support structure may cooperate with the first closed end to form a chamber within the piston and define an orifice for fluid communication therewith, thereby reducing the amount of material needed to form the regulating piston and reducing the weight of the regulating piston and valve. The support may therefore substantially enclose a space within the piston adjacent the first closed end, which space may fluidly communicate with a remaining volume of the piston via the orifice. Since the support is inside the piston, the orifice may also be located within the piston. The support may define the orifice on a longitudinal axis of the piston. The orifice may therefore provide fluid communication between interior portions of the piston. The orifice may be sized so as to provide only a relatively low rate of fluid flow therethrough. The orifice may provide means to remove e.g. residual powder from the chamber during additive manufacturing (e.g. by laser sintering) of the piston.

By forming a chamber within the piston, the support structure may reduce the regulating volume within the piston compared to that of conventional pistons so that in use the piston may respond more quickly to changes in system pressure. Thus, the support may improve the efficiency of the system in this regard by regulating pressure more quickly. The first closed end of the piston may be substantially flat in order to reduce the volume of the chamber of regulation.

The regulating piston may comprise a plurality of support ribs within the chamber connecting the first closed end of the piston with the support structure. The support ribs may improve the structural integrity and properties of the regulating piston. The support ribs may also aid in the manufacture of the piston by providing a root of material from which the supporting structure may be formed and by which the support structure may be propped up so that it does not collapse during formation by additive manufacturing. An optimum position of the supporting ribs may be determined e.g. using numerical and/or iterative techniques and computer simulations.

The support structure may serve to direct and guide forces within the piston and hence may align its stress distribution, increasing the piston's durability and reliability e.g. in respect of vibrational forces, high pressures, material fatigue etc. The support structure may also avoid the need to use an additional capping disc for the piston.

The support structure of the regulating piston may simultaneously improve the structural integrity of the regulating piston and improve efficiency of the valve by improving its fluid dynamics by driving fluid flow between the port and the second open end of the piston.

According to a second aspect of the present invention there is provided a pressure regulating shut-off valve (PRSOV) comprising a regulating piston as described in relation to the first aspect.

The PRSOV may comprise: a first portion defining a valve outlet; a second portion coupled to the first portion and defining a valve inlet; and a cartridge portion coupled to the first portion and disposed within the second portion; wherein the first portion and cartridge portion cooperate to house the regulating piston and permit the regulating piston to move between a first position and a second position to regulate fluid flow through the valve.

The first and second portions may be coupled by screws or any other suitable means. The coupling may be removable, particularly non-destructively removable (e.g. capable of being de-coupled and re-coupled). The valve may therefore be disassembled and the piston and cartridge portion accessible for the purposes of repair and maintenance and the like.

Any suitable means may be used to couple the cartridge portion and the first portion so as to provide a housing for the regulating piston. The coupling between the cartridge portion and the first portion may be removable, particularly non-destructively removable. Thus, during assembly, the regulating piston may be inserted into the cartridge portion and/or first portion, and the cartridge portion may be coupled to the first portion so that the first portion, cartridge portion, and regulating piston may be handled as a single piece with the regulating piston enclosed within the cartridge portion and the first portion and properly seated therein for use within the valve. The cartridge portion may then be inserted into the second portion and the first and second portions coupled, thereby automatically positioning and aligning the piston within the PRSOV. Once the PRSOV is assembled, the cartridge portion may be entirely within the second portion of the valve.

The space provided by the cartridge portion and first portion for housing the regulating piston may be any suitable shape and size. Particularly, it may permit the regulating piston to move between a first open position in which the port of the regulating piston is arranged such that fluid may flow from the inlet of the second portion to the outlet of the first portion via the port, and a second closed position in which the port of the regulating piston is arranged such that fluid may not flow from the inlet to the outlet. The cartridge portion may comprise a cartridge port arranged to fluidly communicate with the port of the regulating piston when the regulating piston is in the first open position, so that fluid may flow from the valve inlet to the valve outlet via the cartridge port and the port of the regulating piston. This arrangement may also allow simple maintenance and repair of the PRSOV since the piston may be easily inspected etc. by decoupling the first and second portions.

The second portion may comprise a conduit arranged to carry fluid flow from the inlet of the second portion to the regulating piston. When the regulating piston is in the first open position, the conduit may provide fluid flow to the port of the piston. The walls of the conduit may curve smoothly to reduce turbulence within the fluid flowing therein and to direct the fluid flow into the regulating piston in a preferred direction. The preferred direction may be radially inwards of the valve, and may be directly radially inwards. The conduit may be shaped to cooperate with or complement the shape of the support structure within the regulating piston to keep disturbance of the fluid flow as low as possible by smoothly changing the direction of the fluid flow. The conduit and the support structure of the regulating piston may together define an S-shaped flow path for fluid within the valve.

The first and/or second portion(s) may comprise a means of increasing the durability of the valve in respect of high frequency vibrations. The first and/or second portion(s) may comprise a plurality of integral ribs in a longitudinal direction arranged to increase the durability of the valve in respect of high frequency vibrations. The longitudinal ribs may be defined on the surface of the first and/or second portion(s). The longitudinal direction of the valve may be defined between the inlet and outlet, and the integral ribs may be oriented substantially in that direction. PRSOVs may be used in extreme conditions and may be subject to high-frequency vibrations and high stresses. Such forces can cause material fatigue, microfracturing, deformation and so on and even catastrophic failure. The integral ribs may improve the structural integrity of the valve in respect of such forces.

The first and/or second portion(s) may comprise a means of increasing the durability of the valve in respect of internal pressure. The first and/or second portion(s) may comprise a plurality of integral ribs in a radial direction arranged to increase the durability of the valve in respect of internal pressure. The radial ribs may be defined on the surface of the first and/or second portion(s). The radial ribs may be defined on the surface of the first and/or second portion(s) in a direction perpendicular to the longitudinal direction. PRSOVs may operate at high pressures and pressure differentials and as such may need to be durable and reliable in view of high internal forces and stresses. The radially arranged integral ribs may improve the structural integrity of the valve in respect of such forces.

The first and/or second portion(s) may comprise a web of integral ribs. The web of integral ribs may comprise a plurality of longitudinal integral ribs and a plurality of radial integral ribs. The web of integral ribs may comprise integral ribs oriented in any direction. The arrangement of ribs in the web may be determined to optimise the valve's structural integrity, and may be determined by numerical analysis, iterative processes, and/or computer simulations etc.

The integrals ribs may be formed by additive manufacturing together with the first and/or second portion(s) of the valve. As such, the ribs may be optimally integrated with their respective portions to provide as much structural support as possible.

An outer wall of the first portion may be thinner than that of conventional valves. It may be between about 1 and 3 millimetres, particularly about 2 millimetres thick. An outer wall of the second portion may be thinner than that of a conventional valve. It may be between about 0.5 and 1.5 millimetres thick, particularly about 1 millimetre thick, or 1.1 millimetres thick. The integrals ribs may be between about 2 and 3 millimetres thick, particularly between about 2.1 millimetres and 2.5 millimetres thick, and may be about 2.1 millimetres thick. The integral ribs may be thicker than walls of the conventional valves, or may be thinner than walls of conventional valves, providing sufficient structural integrity by virtue of their arrangement.

The first and/or second portion(s) may comprise outwardly extending features (e.g. extending away from a central portion of the valve) and may further comprise buttresses arranged to support those features. The buttresses may be arranged to prevent and/or absorb bending moments applied to the outwardly extending features, which bending moments might otherwise cause fatigue and/or failure of the first and/or second portion(s). The buttresses may be formed by additive manufacturing, and may extend primarily in a direction substantially orthogonal to the arrangement of constituent layers of the portions. In this way, the buttresses may provide a root of material from which their respective outwardly extending features may be formed during additive manufacturing.

The integral ribs and/or buttresses may be arranged to achieve a desired structural integrity for the valve. The first and/or sections portions of the valve may be formed by additive manufacturing and as such the walls and other features of the valve may be formed using only as much material as is essential. In this way, the PRSOV may be lighter and/or more durable than conventional valves.

According to a third aspect of the present invention there is provided a method of manufacturing a regulating piston for a pressure regulating shut-off valve (PRSOV) as described in relation to the first aspect, the method comprising:

simultaneously forming a portion of the tubular sleeve and a portion of the support structure in order to support the tubular sleeve during formation thereof The regulating piston may therefore comprise a geometry that would otherwise not be possible. The regulating piston may be more durable by virtue of e.g. a support structure and/or support ribs. The method may comprise using any suitable additive manufacturing technology, such as e.g. laser sintering or the like.

According to a fourth aspect of the present invention there is provided a method of manufacturing a pressure regulating shut-off valve (PRSOV) as described in relation to the second embodiment, the method comprising: inserting the regulating piston into the first portion and/or into the cartridge portion of the valve; inserting the cartridge portion into the second portion of the valve; and fixing the first portion to the second portion.

The method may comprise inserting the regulating piston into the first portion and/or cartridge portion in order to correctly house and align the regulating piston with respect to the first portion and cartridge portion. The method may comprise inserting the cartridge portion into the second portion in order to correctly locate and/or align the regulating piston within the PRSOV and with respect to the second portion.

The method may comprise forming any and all of the first portion, the second portion, the cartridge portion and the regulating piston using an additive manufacturing technique. The method may comprise forming the first portion, the second portion, the cartridge portion and/or the regulating piston as separate, distinct components which subsequently require assembly to form the valve. The method may comprise using the buttresses to provide roots of material from which outwardly extending portions of the valves may be formed and supported during manufacturing.

The method may comprise manufacturing a regulating piston as described in relation to the third aspect. The method may comprise using the support structure to provide a root of material from which at least a portion of the tubular sleeve may be formed and supported during manufacturing. The method may comprise using the support ribs to provide a root of material from which the support structure may be formed and supported during manufacture.

BRIEF DESCRIPTION OF DRAWINGS

Certain preferred embodiments of the invention are described in detail below by way of example only and with reference to the drawings in which.

DETAILED DESCRIPTION

Figure 1A:
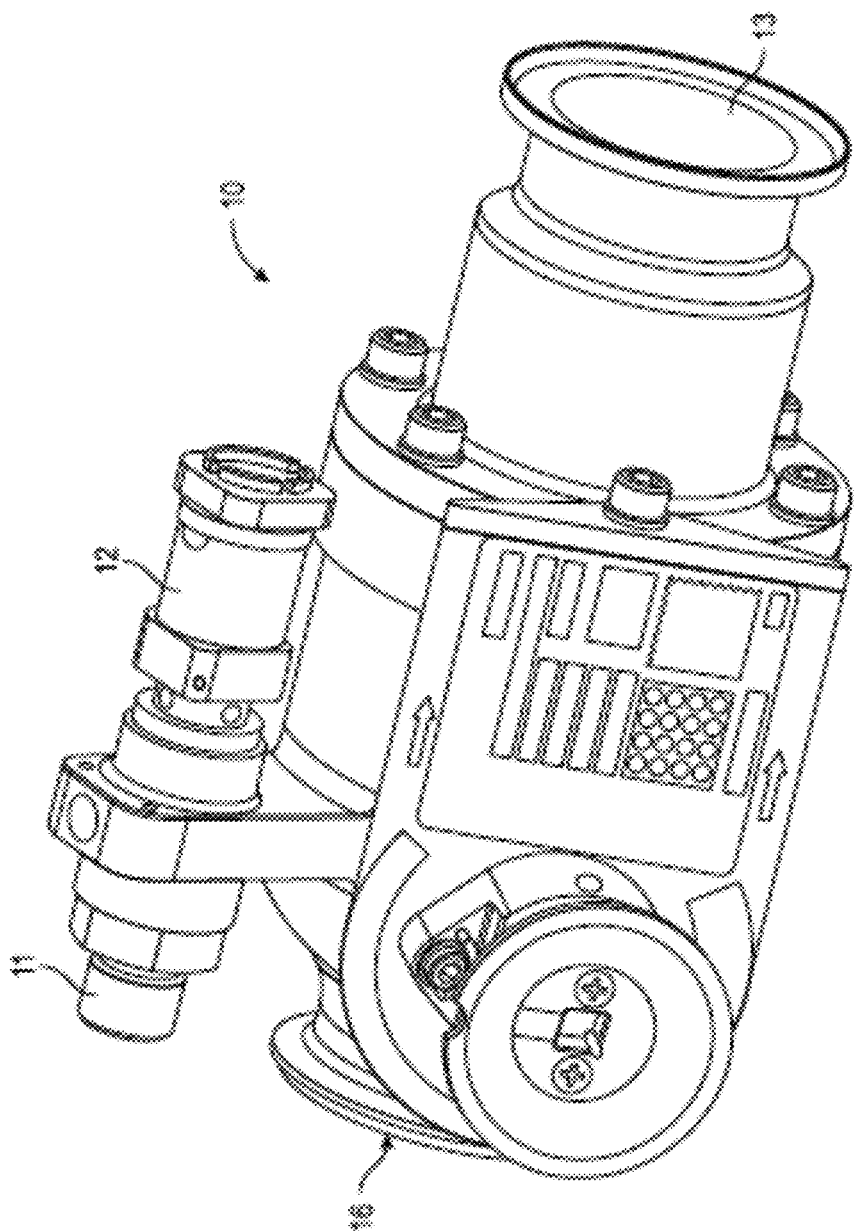
FIG. 1A shows a perspective view of a typical pressure regulating shut-off valve (PRSOV)
Figure 1B:
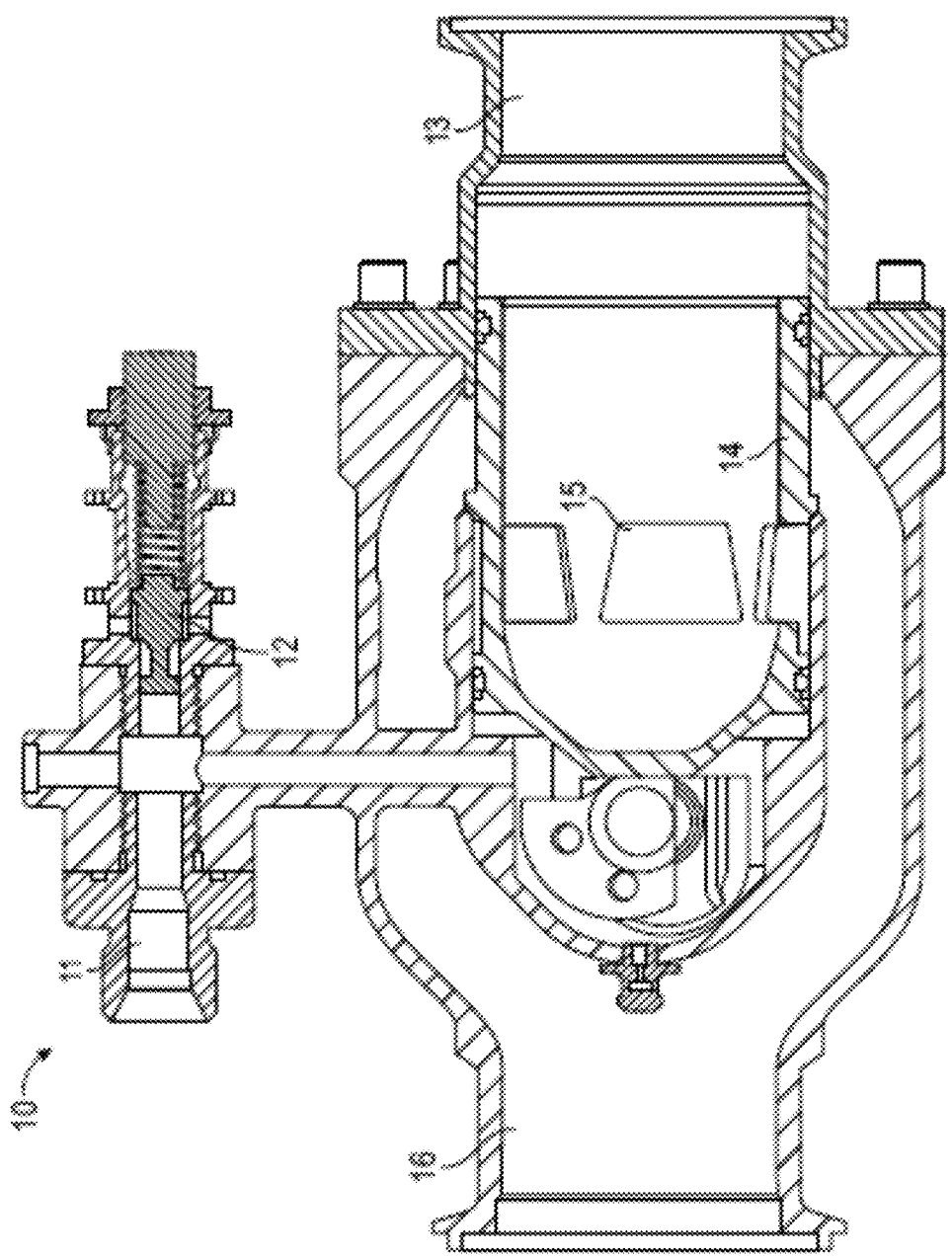
FIG. 1B shows a cross-section of the PRSOV of FIG. 1A comprising a known regulating piston.

FIG. 1A shows a perspective view of a conventional pressure regulating shut-off valve (PRSOV) 10. The valve comprises an inlet 16, an outlet 13, a pressure relief valve 12, a solenoid valve 11. FIG. 1B shows a cross-sectional view of the valve of FIG. 1A, and further shows a regulating piston 14. The shut-off function of the valve is pneumatically operated and electrically controlled by the on-board mounted solenoid valve 11, while the pressure regulating function is controlled by the pressure relief valve 12. Both functions are achieved using the inlet pressure and flow to control the position of the regulating piston 14. In FIG. 1B, the regulating piston 14 is shown in its closed position such that ports 15 within the piston 14 are not in communication with fluid flow form the inlet 16, and hence the piston prevents fluid flow form the inlet 16 to the outlet 13. When downstream pressure falls to a predetermined level, the piston 14 moves to the right (in FIG. 1B) and the ports 15 therein allow fluid to flow from the inlet 16 to the outlet 13. The valve 10 hence regulates pressure and shuts-off flow based on the position of the regulating piston 14 within the valve 10.

Figure 2A:
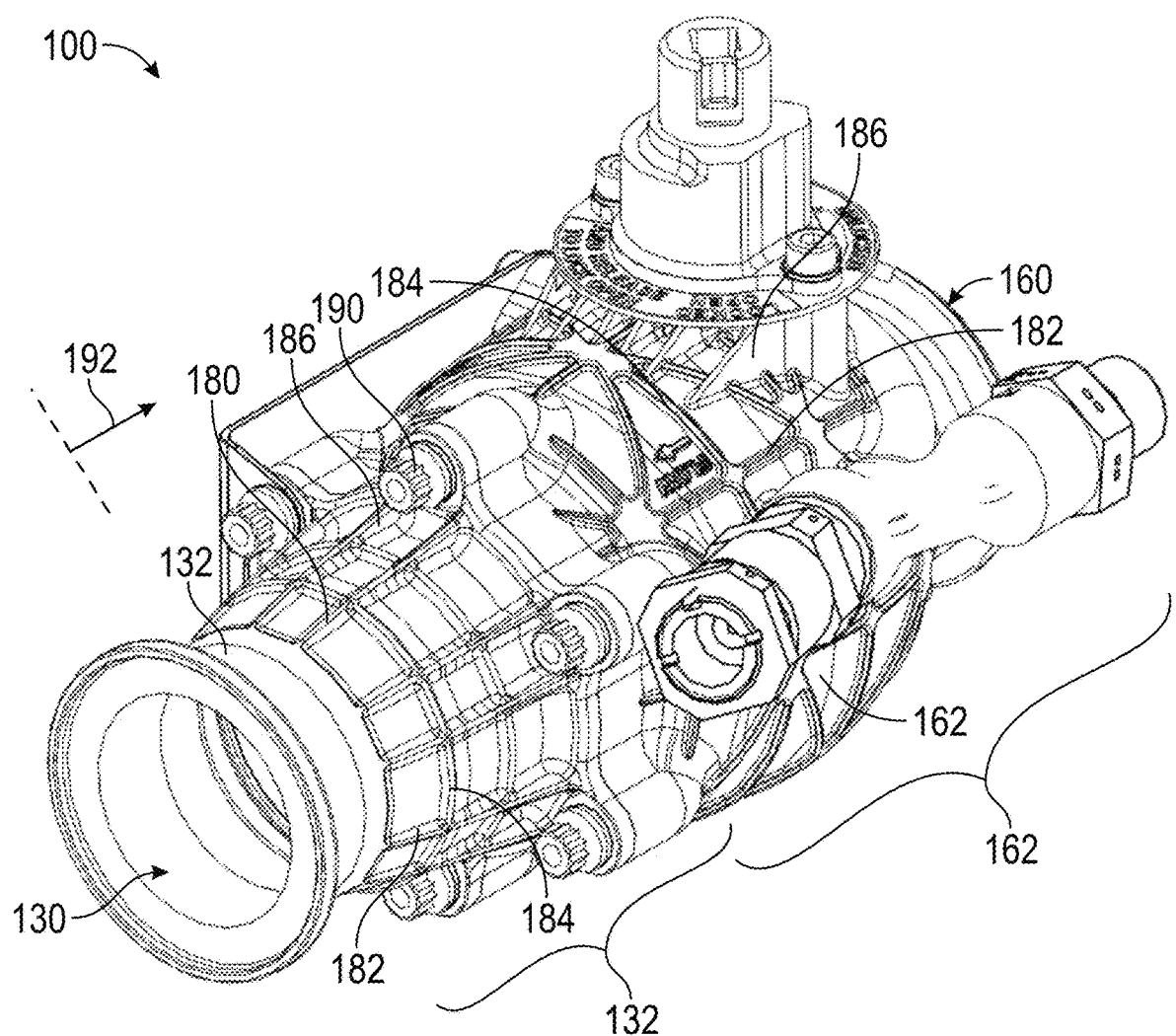
FIG. 2A shows a perspective view of a pressure regulating shut-off valve (PRSOV)

FIG. 2A shows a perspective view of a pressure regulating shut-off valve (PRSOV) 100 comprising a first portion 132 defining a valve outlet 130, and a second portion 162 defining a valve inlet 160. The first portion and second portion are coupled together by screws 190. The first portion 132 and the second portion 162 are separate and distinct parts. The screws permit the first portion 132 and second portion 162 to be removably and replaceably coupled, de-coupled, and re-coupled to permit e.g. maintenance of the valve 100. Any suitable coupling mechanism may be used. FIG. 2C shows a second perspective view of the pressure regulating valve 100.

Figure 2B:
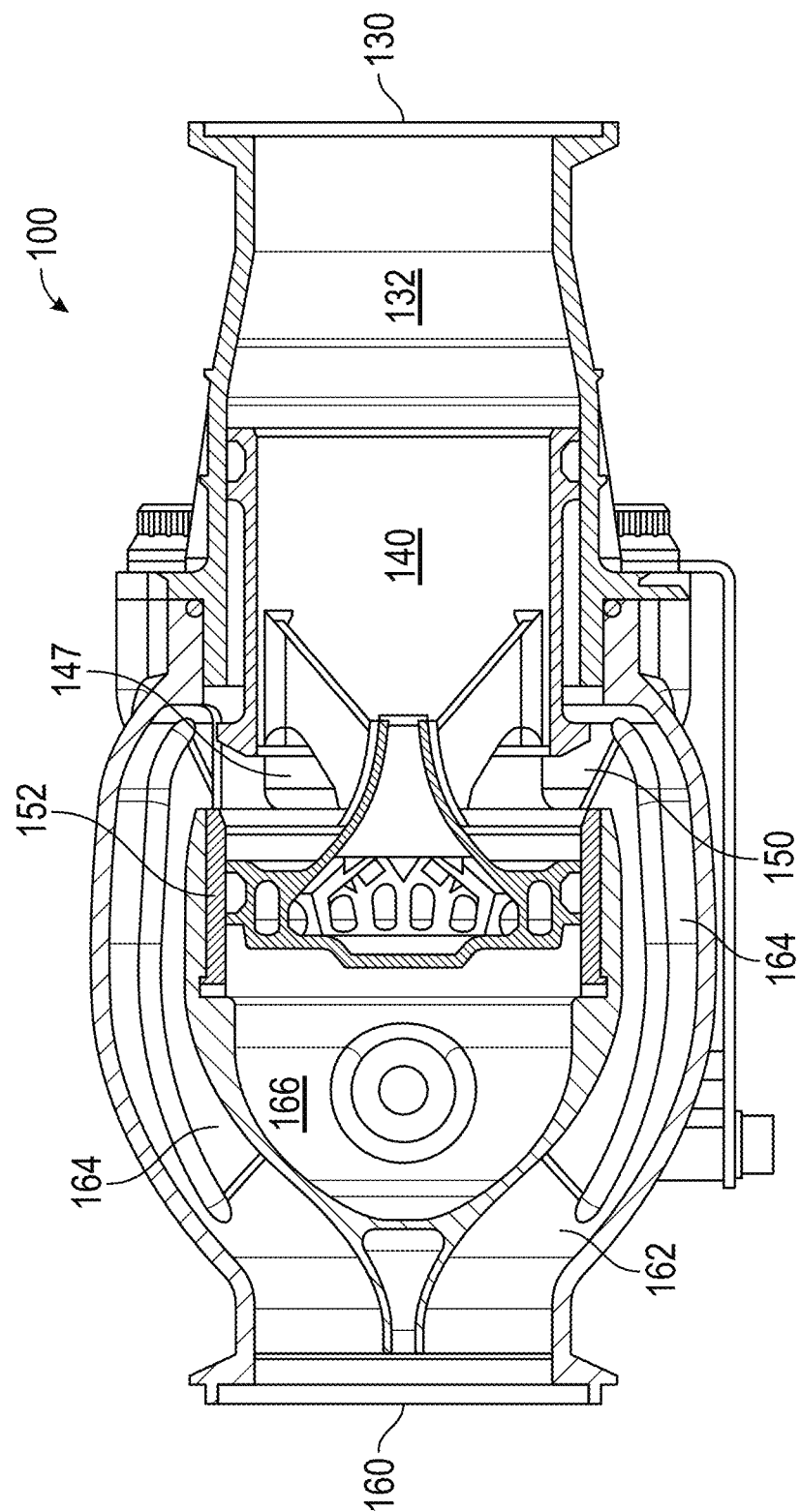
FIG. 2B shows a cross-section of the PRSOV of FIG. 2A comprising a regulating piston.
Figure 2C:
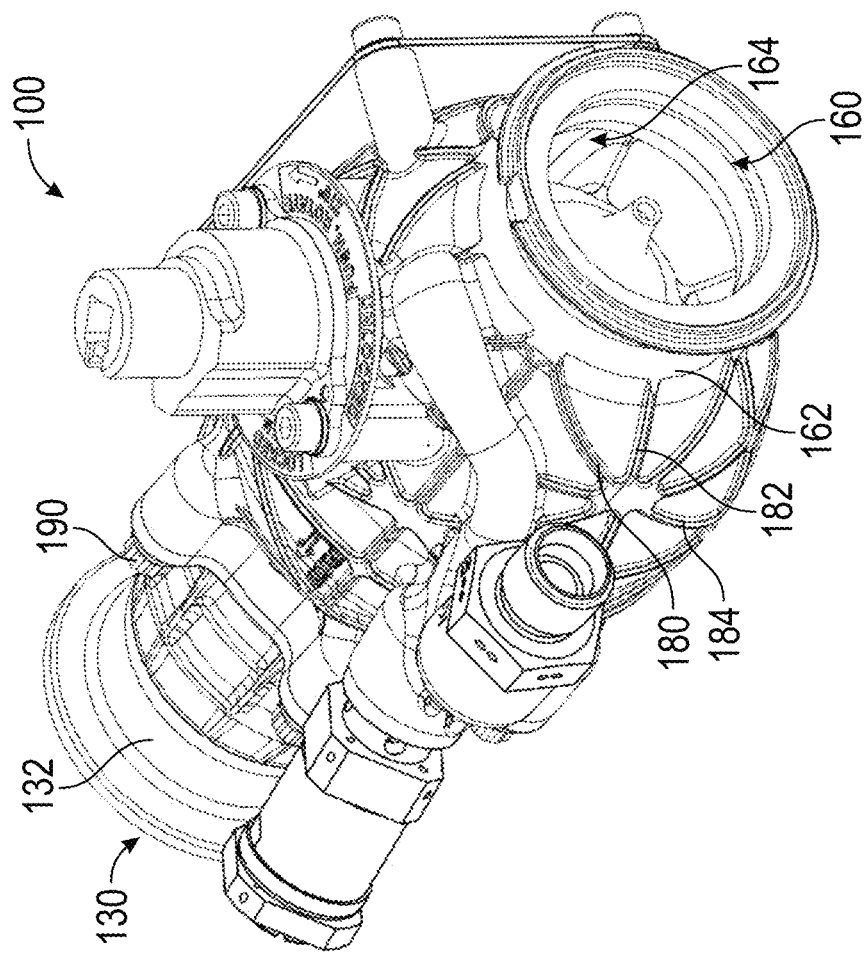
FIG. 2C shows a perspective view of the PRSOV of FIGS. 2A and 2B.

FIG. 2B shows a cross-section of the valve 100 of FIG. 1A, and further shows a cartridge portion 152. The cartridge portion 152 is fixedly connected to the first portion 132 by any suitable means, and is surrounded and housed by the second portion 162 when the valve 100 is assembled. The cartridge portion 152 cooperates with the first portion 132 of the valve 100 to enclose a regulating piston 140 and permit movement of the piston 140 in a direction along its longitudinal axis. Thus, during assembly of the valve 100, the piston 140 may be inserted (e.g. at least partially) into the first portion 132 and the cartridge portion 152 may then be coupled to the first portion 132 in order to form a valve segment that may be handled as a single piece. The cartridge portion 152 and piston 140 housed therein may then easily be inserted into the second portion 162, the screws 190 being used to affix the first portion 132 to the second portion 162 and thereby simply and reliably assemble the valve 100 with the piston correctly and reliably positioned and aligned therein. Moreover, the screws 190 may be removed to disassemble the valve 100 and allow maintenance, repair, and so on.

Figure 3A:
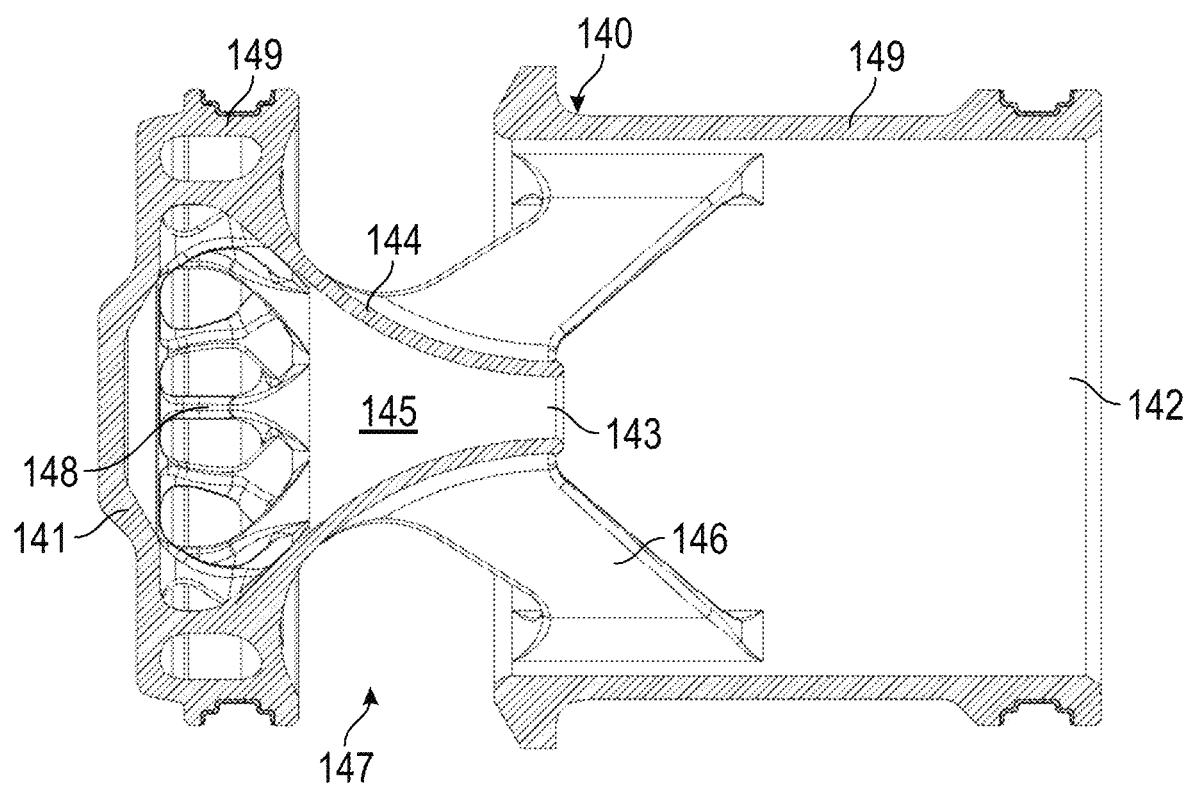
FIG. 3A shows a cross-section of a regulating piston for use in the PRSOV of FIGS. 2A, 2B, and 2C.
Figure 3B:
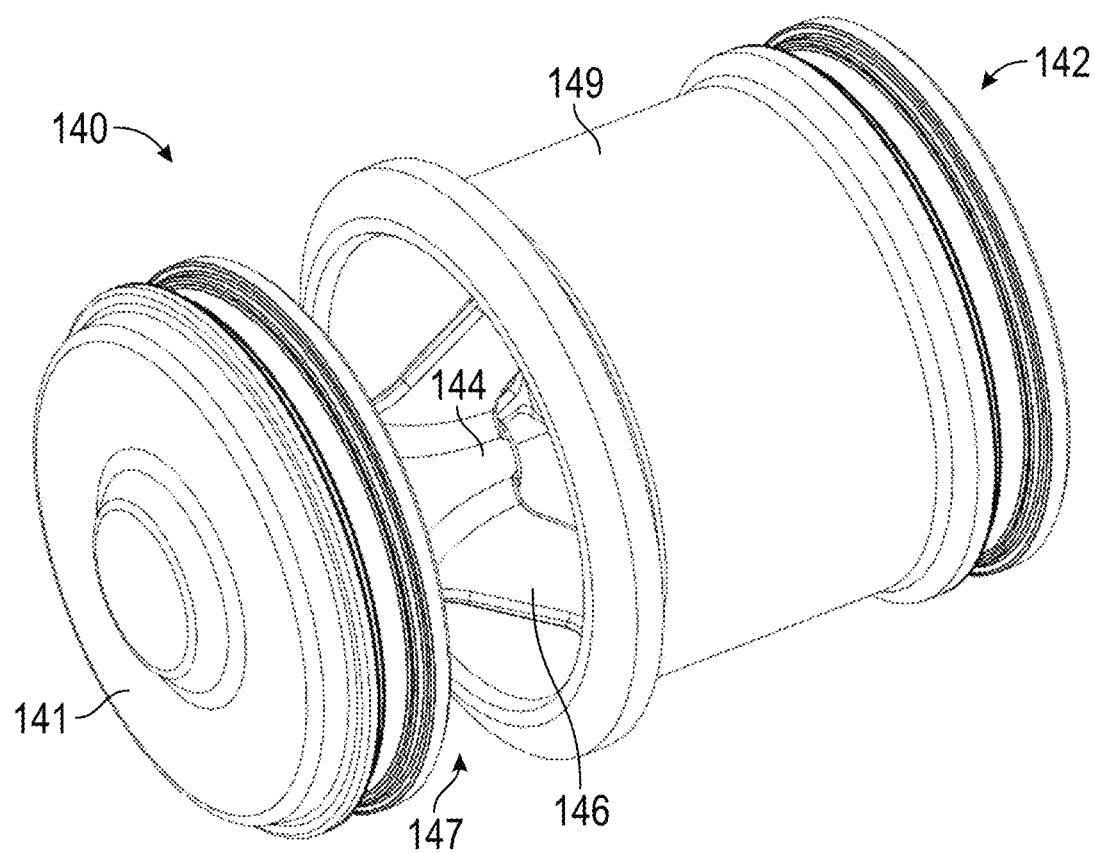
FIG. 3B shows a perspective view of the regulating piston of FIG. 3A.

FIG. 3A shows a cross-section of the regulating piston 140. The piston 140 is generally cylindrical and comprises a tubular sleeve 149, a first end 141 which is closed and a second end 142 which is open. The piston also comprises a port 147 which consists of an open ring about the perimeter of the piston 140 between the first closed end 141 and the second open end 142, and which divides the tubular sleeve 149 into two portions. The port 147 permits fluid flow into the interior of the piston, which fluid may further flow during use out of the second open end 142. FIG. 3B shows a perspective view of the regulating piston 140, wherein the port 147 can be seen to extend about the entire circumference of the tubular sleeve 149.

The regulating piston 140 also comprises a support structure 144 entirely inside the piston. The support 144 is shaped to curve smoothly from the port 147 towards the second open end 142. Consequently, during use of the valve, turbulence in fluid flowing through the port 147 into the piston 140 is reduced and may be avoided altogether, thereby improving the efficiency of the valve 100. The support structure 144 also comprises vanes 146 which project radially from the support 144 to provide structural support to the tubular sleeve 149. The vanes 146 are shaped to allow fluid to flow smoothly thereover and to avoid inducing turbulence.

The support structure 144 also cooperates with the first closed end 141 to define a chamber 145 adjacent the closed end 141. An orifice 143 is also defined by the support 144 which permits fluid communication into the chamber 145. During manufacture (e.g. by laser sintering or the like) the orifice 143 allows raw powder (from which the piston is formed) to be removed from the chamber 145. A plurality of support ribs 148 are disposed between the first closed end 141 of the piston 140 and the support structure 144. These support ribs 148 improve and increase the piston's structural durability. Their distribution may be optimised by numerical and/or iterative means to provide improved mechanical properties to the piston. The support ribs 148 also provide a base structure from which the support 144 may be formed during manufacture by additive manufacturing techniques.

It will be appreciated that the arrangement of the support ribs 148, the chamber 145, the support structure 144 and the vanes 146 of the piston 140 is such that it would be difficult or even impossible to manufacture it using conventional means such as punching, casting, lathing, stamping etc. The regulating piston 140 is therefore manufactured using additive manufacturing techniques in which layers of material are sequentially added to form the final piece. As such, the support structure 144 serves a dual purpose of not only improving fluid dynamic properties of the piston 140 but also providing support to segments of the piston 140 during additive manufacturing and during use in the valve 100. Indeed, the location of the support 144 within the piston 140 makes it possible to provide the port 147 that extends about an entire circumference of the piston 140, thereby increasing the rate of mass flow through the piston 140 and reducing interference with fluid flow.

Returning to FIG. 2B, the piston 140 is shown in its open position within the valve 100, wherein the port 147 of the piston 140 is aligned with a corresponding cartridge port 150 of the cartridge portion 152. In this position, the port 147 of the piston 140 allows fluid flow from the inlet 160 to the outlet 130, via the cartridge port 150.

A channel 164 is arranged within the second portion 162 of the valve 100 and carries mass flow from the inlet 160 towards the cartridge port 150. The channel 164 curves smoothly and thereby reduces the occurrence of turbulence within fluid flow therein. Fluid leaving the channel 164 passes through the cartridge port 150 and then undisturbed through the port 147 of the piston 140 and is directed by the support structure 144 of the piston 140 towards the second open end 142 of the piston 140 and the outlet 130 of the valve. The channel 164 and the support structure 144 cooperate to define (in section) an S-shaped fluid flow path within the valve. Such smooth fluid flow control for reducing turbulence is possible because the piston 140 and the second portion 162 of the valve 100 are formed by additive manufacturing techniques and hence their geometries can be carefully and precisely controlled.

When pressure downstream of the valve 100 increases beyond a predetermined threshold, pressure within the piston 140 increases and a pressure differential is formed between the interior of the piston 140 and a regulating chamber 166 defined by the second portion 162 of the valve 100. Hence, the regulating piston 140 moves left (in the orientation of FIG. 2B) into the regulating chamber 166 so that the port 147 moves out of alignment with the cartridge port 150. In its closed position, the tubular sleeve 149 of the piston 140 will obstruct the passage of fluid through the cartridge port 150 and into the piston 140, thereby shutting off fluid flow through the valve 100 and allowing downstream pressure to be reduced.

The support structure 144 also reduces the volume of space within the piston 140 and thereby increases its response to changes in pressure, since a smaller change will be needed to create a predetermined pressure differential within the piston 140.

FIGS. 2A and 2C show a web of integral ribs 180 on each of the first portion 132 and second portion 162 of the valve 100. Since the first portion 132 and second portion 162 of the valve 100 are formed by additive manufacturing, it is possible to exercise fine control over their structure. In particular, it is possible to provide integral ribs 180 formed with each of the portions to provide suitable durability and mechanical properties to the valve, while reducing the overall weight.

Figure 4A:
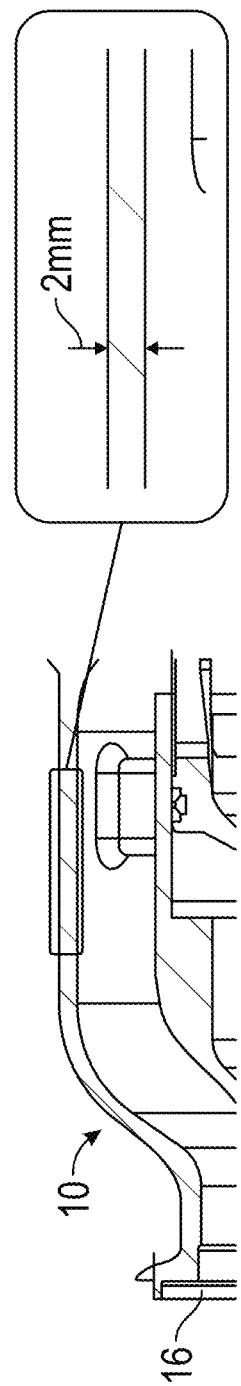
FIG. 4A shows a portion of a known PRSOV.
Figure 5A:
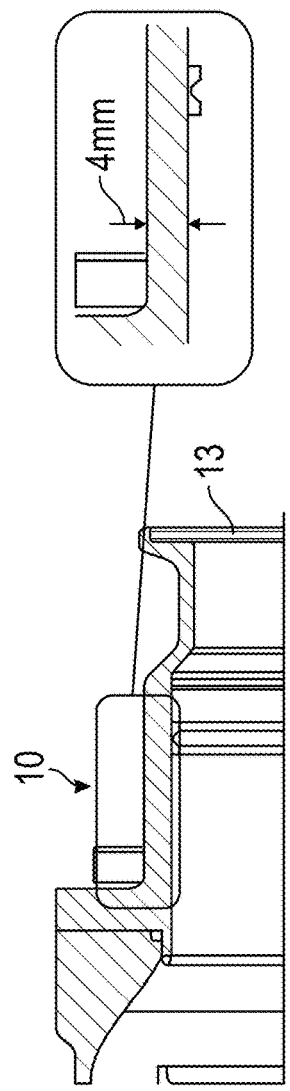
FIG. 5A shows a portion of a known PRSOV.

FIGS. 4A and 5A show portions of a conventional valve 10, with respective segments of outer walls of that valve 10 shown magnified. Typically, to ensure that the valve 10 is sufficiently durable, the walls of the second portion are about 2 millimetres thick and the walls of the first portion are about 4 millimetres thick.

Figure 4B:
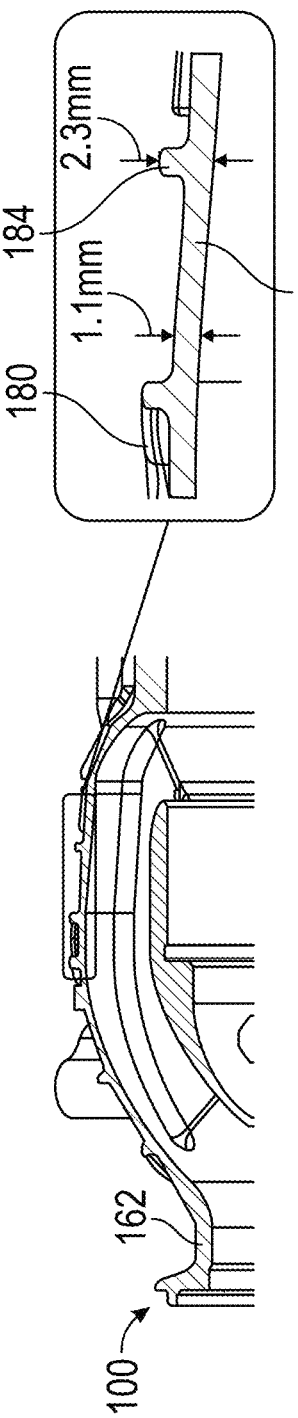
FIG. 4B shows a portion of a PRSOV.
Figure 5B:
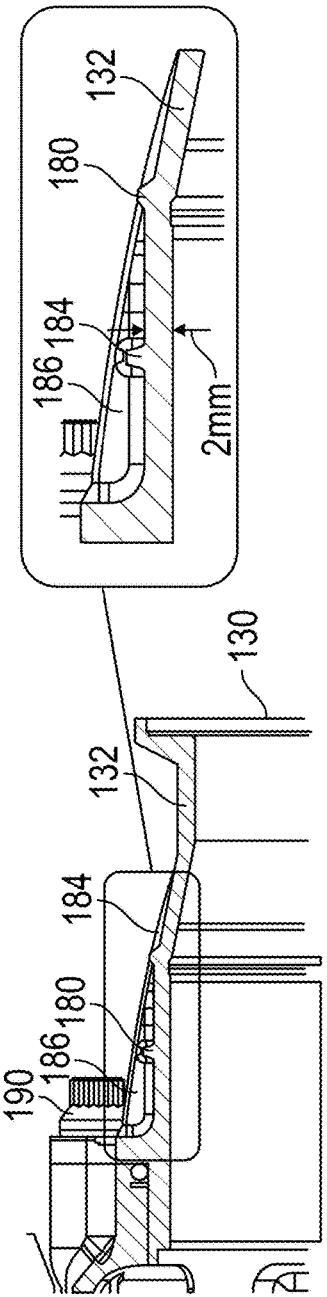
FIG. 5B shows a portion of a PRSOV.

In contrast, FIGS. 4B and 5B show part of the second portion 162 and first portion 132 of the valve 100 respectively, with segments of the corresponding outer walls of those portions shown magnified. The wall of the second portion 162 is about 1.1 millimetres thick over most of its surface, thinner than that of a conventional valve. However, to ensure that the valve is sufficiently resilient and reliable, the integral ribs 180 are included therein. The integral ribs 180 provide increased structural integrity to the portions of the valve 100. In the second portion, they have a thickness of about 2.3 millimetres, thicker than a wall of a conventional valve 10. In the first portion 132, the outer wall is about 2 mm thick over most of its surface, thinner than the 4 mm thick outer wall of a conventional valve 10. Integral ribs 180 are incorporated to provide the necessary structural integrity. Therefore, the overall weight of the valve 100 can be reduced by using less material more intelligently, since the valve 100 is formed using additive manufacturing techniques.

Figure 4C:
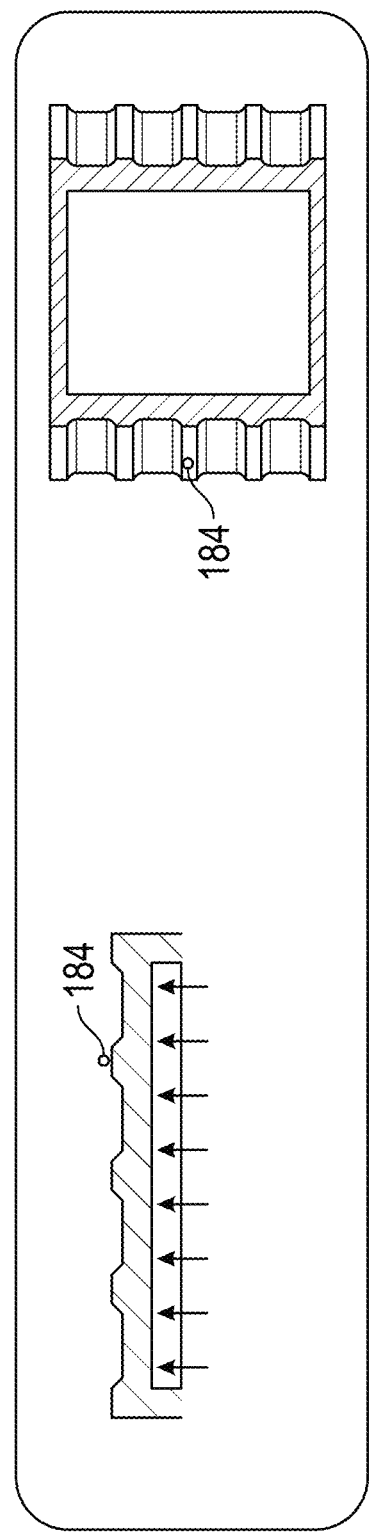
FIG. 4C shows an example of radial ribs.

The arrangement of integral ribs 180 may be chosen to increase desired structural properties. For example, referring back to FIGS. 2A and 2C, each of the first portion 132 and the second portion 162 of the valve 100 comprises longitudinal ribs 182 which are oriented along the length of the valve (in a direction between the inlet 160 and outlet 130). These longitudinal ribs 182 increase the valve's structural integrity in respect of high frequency vibrations, which otherwise can cause fatigue and microfracturing of the valve portions. Each portion also includes radial ribs 184 which are oriented about circumferences of the valve, perpendicular (in the valve's surface) to the longitudinal ribs 182. The radial ribs 184 improve the valve's structural integrity in respect of internal pressure, as shown by the arrows in FIG. 4C acting on a schematic of the valve portion. The arrows indicate internal pressure acting outwardly on the valve portion. The radial ribs 184 are oriented so as to reinforce the valve portion against such outward forces.

Figure 5C:
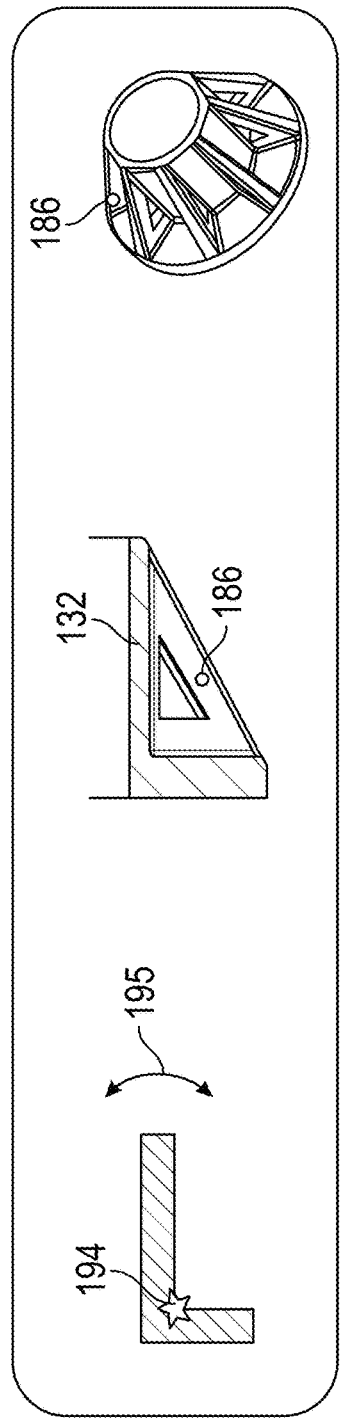
FIG. 5C shows a buttress of a PRSOV.

FIGS. 5B and 5C show examples of an integral buttress 186, which may be provided to give mechanical support to parts of the valve portions that project outwards from the valve's surface. Moreover, the buttresses 186 provide support for the same parts of the valve portions during formation by additive manufacturing. The arrow 195 shows how a bending moment may be applied to a point 194 at the intersection of valve parts at an angle. Such bending moments can cause fatigue of the valve materials and even catastrophic failure of the valve. The buttresses 186 provide a means of preventing such bending moments.

In FIG. 2A, the arrow 192 shows the direction in which the valve portions are formed by additive manufacturing of sequential layers. The buttresses 186 extend out from their respective surfaces in that direction in order to support projecting elements from the valve portions. Hence, the buttresses 186 may serve a dual purpose of increasing structural integrity of the valve and preventing collapse of outwardly extending portions of the valve during formation.

The present disclosure provides examples of how additive manufacturing techniques allow greater control over the shape and size of a PRSOV, and hence may be used to improve upon conventional valves. The disclosure provides for more than merely the creation of existing elements by a different method (i.e. additive manufacturing), but in fact provides new components that would otherwise be too complicated or even impossible to manufacture e.g. due to their internal geometry. The new components provide structural, mechanical, weight and efficiency advantages to the valve compared to known valves.

The invention claimed is:

1. A regulating piston for a pressure regulating shut-off valve, wherein the regulating piston comprises:
   a tubular sleeve;
   a first closed end;
   a second open end;
   a port defined in the tubular sleeve between the first and second ends, arranged to permit fluid flow between the exterior and interior of the regulating piston; and
   a support structure disposed within the piston arranged to direct fluid flow between the port and the second open end;
   wherein the port extends about the entire periphery of the piston and wherein the port is a single hole that extends about the entire periphery of the piston.

2. The regulating piston as claimed in claim 1, wherein the support structure bridges the port.

3. The regulating piston as claimed in claim 1, wherein the support structure cooperates with the first closed end to form a chamber within the piston and defines an orifice for fluid communication therewith.

4. The regulating piston as claimed in claim 3, comprising a plurality of support ribs within the chamber connecting the first closed end of the piston with the support structure.

5. A pressure regulating shut-off valve comprising:
   a regulating piston as recited in claim 1.

6. The pressure regulating shut-off valve as claimed in claim 5, further comprising:
   a first portion defining a valve outlet;
   a second portion coupled to the first portion and defining a valve inlet; and
   a cartridge portion coupled to the first portion and disposed within the second portion;
   wherein the first portion and the cartridge portion cooperate to house the regulating piston and permit the regulating piston to move between a first position and a second position to regulate fluid flow through the valve.

7. The pressure regulating shut-off valve as claimed in claim 6, wherein the first or second portion(s) comprise a plurality of integral ribs in a longitudinal direction arranged to increase the durability of the valve in respect of high frequency vibrations.

8. The pressure regulating shut-off valve as claimed in claim 6, wherein the first or second portion includes a plurality of integral ribs in a radial direction arranged to increase the durability of the valve in respect of internal pressure.

9. The pressure regulating shut-off valve as claimed in claim 6, wherein the first or second portion includes a web of integral ribs.

10. The pressure regulating shut-off valve as claimed in claim 6, wherein an outer wall of the first or second portion is about 2 millimetres thick.

11. The pressure regulating shut-off valve as claimed in claim 6, wherein the first or second portion includes an outwardly extending feature and further comprise a buttress arranged to support the outwardly extending feature.

12. The pressure regulating shut-off valve as claimed in claim 6, wherein the first or second portion is formed by additive manufacturing.

13. A method of manufacturing a pressure regulating shut-off valve as recited in claim 6,
   the method comprising:
      inserting the regulating piston into the first portion and/or into the cartridge portion of the valve;
      inserting the cartridge portion into the second portion of the valve; and
      fixing the first portion to the second portion.

14. A method of manufacturing the regulating piston as recited in claim 1,
   the method comprising:
   forming a portion of the tubular sleeve;
   simultaneously with forming the tubular sleeve, forming a portion of the support structure in order to support the tubular sleeve during formation thereof.

* * * * *